United States Patent [19]

King, III

[11] Patent Number: 5,537,657

[45] Date of Patent: Jul. 16, 1996

[54] TELECOMMUNICATIONS DEVICE WITH MEANS FOR LEARNING AND RESPONDING TO A DISTINCTIVE RING CADENCE

[75] Inventor: Clarence R. King, III, Solana Beach, Calif.

[73] Assignee: Hewlett-Packard Company, Palo Alto, Calif.

[21] Appl. No.: 523,034

[22] Filed: Aug. 31, 1995

Related U.S. Application Data

[63] Continuation of Ser. No. 165,360, Dec. 13, 1993.

[51] Int. Cl.⁶ .................................................... H04M 1/54
[52] U.S. Cl. .............................................. 379/179; 379/373
[58] Field of Search ........................... 379/373, 179, 379/100, 96, 97, 98, 99, 374, 375

[56] References Cited

U.S. PATENT DOCUMENTS

| 4,910,764 | 3/1990 | Bowen | 379/100 |
|---|---|---|---|
| 5,040,209 | 8/1991 | Greenberg et al. | 379/372 |
| 5,062,133 | 10/1991 | Melrose | 379/94 |
| 5,086,458 | 2/1992 | Bowen | 379/180 |
| 5,142,569 | 8/1992 | Peters et al. | 379/373 |
| 5,253,289 | 10/1993 | Tanaka | 379/373 |
| 5,323,451 | 6/1994 | Yatsunami | 379/373 X |

FOREIGN PATENT DOCUMENTS

| 54-65404 | 5/1979 | Japan . |
|---|---|---|
| 61-53861 | 3/1986 | Japan . |
| 62-152256 | 7/1987 | Japan . |
| 63-232676 | 9/1988 | Japan . |

OTHER PUBLICATIONS

Patent Abstract of Japan, vol. 14, No. 241 (E–0931) 22 May 1990 JP-A–01 065 351.

Globecom '85 –Cat. No. 85CH2190-7, vol. 1, 2 Dec. 1985, New Orleans, LA, USA, pp. 316–319, F. J. Bruzek, 'Class Calling Service–. . . '.

European Search Report, dated 19 Apr. 1995, EP 94 30 8987, Montalbano, F.

Patent Abstracts of Japan, Publication No. JP63187956, Publication Date 03–08–88, Applicant: NEC Corp., AUTOMATIC ANSWERING TELEPHONE SET.

Patent Abstracts of Japan, Publication No. JP1136453, Publication Date 29–05–89, Applicant: Matsushita Electric Ind Co Ltd., TELEPHONE SYSTEM.

Patent Abstracts of Japan, Publication No. JP58197956, Publication Date 17–11–83, Applicant: Fuji Xerox KK, FACSIMILE DEVICE.

*Primary Examiner*—Stephen Chin
*Assistant Examiner*—Kevin Kim

[57] ABSTRACT

A telecommunications apparatus is connectable to a line accessible by plural telephone numbers from the public switched telephone network (PSTN). The PSTN identifies which telephone number on the line is being called by applying to the line a distinctive ring cadence. The telecommunications apparatus includes a processor, an interface for connecting to the PSTN, a memory for storing a distinctive ring cadence learn procedure and a nonvolatile memory. The processor is responsive to actuation of the distinctive ring learn procedure to monitor a received ring cadence and to derive distinctive ring data indicating characteristics of the received ring cadence. The processor stores the distinctive ring data in the nonvolatile memory and thereafter responds to received ring cadences to derive ring data therefrom. That ring data is compared with the stored distinctive ring data and if a substantial match is determined, causes the telecommunications apparatus to respond to the ring data.

4 Claims, 2 Drawing Sheets

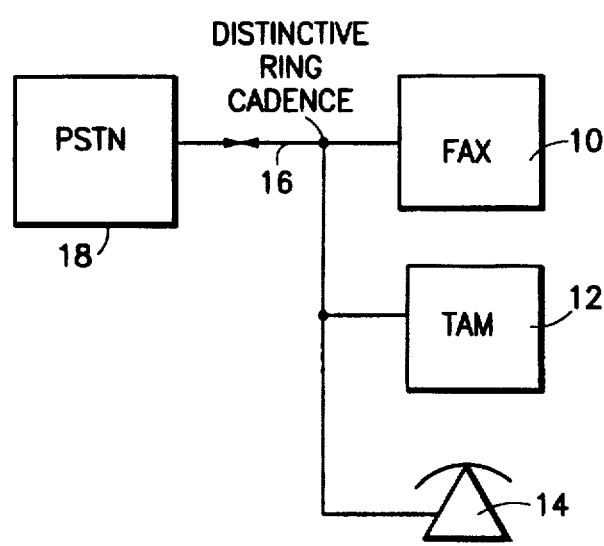
FIG. 1 (PRIOR ART)
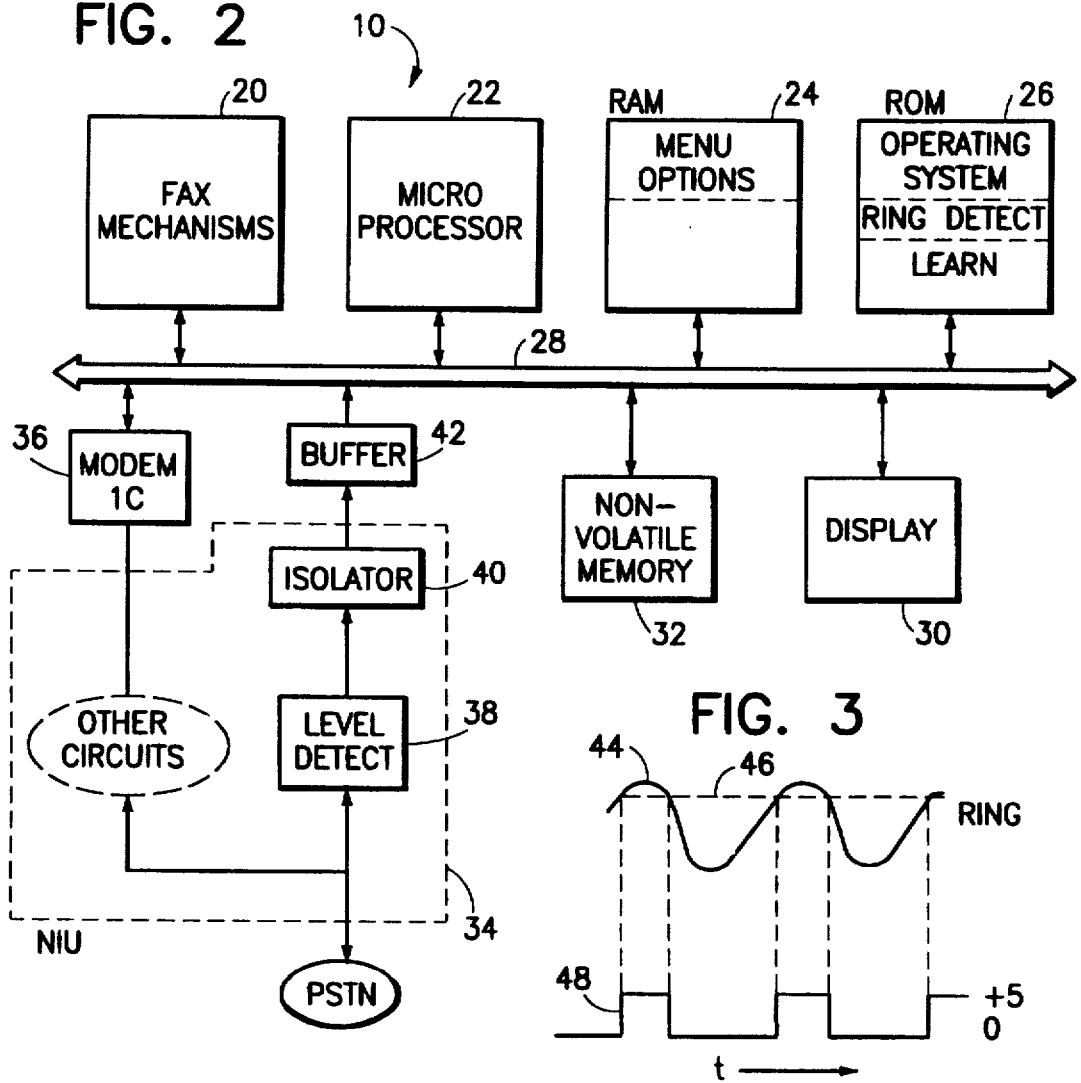
FIG. 2
FIG. 3

TELECOMMUNICATIONS DEVICE WITH MEANS FOR LEARNING AND RESPONDING TO A DISTINCTIVE RING CADENCE

This is a continuation of copending application(s) Ser. No. 08/165,360 filed on Dec. 13, 1993.

FIELD OF THE INVENTION

This invention relates to telecommunications apparatus, and more particularly, to such apparatus that is adapted to respond to a distinctive ring cadence experienced over the public switched telephone network (PSTN).

BACKGROUND OF THE INVENTION

"Distinctive ring" is a service provided by local telephone companies around the world. This feature is also referred to as "Ring Mate", "Identa-Ring", "Ring Master", "Personalized Ring" etc. The distinctive ring service allows a customer to have a single telephone line over which two or more telephone numbers may be accessed. Such access is enabled by the destination telephone or apparatus responding to a distinctive ring cadence associated with a particular one of the telephone numbers. With respect to facsimile machines, the distinctive ring feature enables a programming of the facsimile to recognize only one ring cadence and thus to only answer appropriate calls, i.e., facsimile calls.

Facsimile machines currently being marketed provide menus of different ring cadences from which to choose. These allow a customer to pick from a long ring, two short rings, one short — one long — one short ring, etc. Such an implementation has a number of drawbacks. First, facsimile machines cannot be programmed for a ring cadence supplied by the customer's local telephone company but which is not implemented in the facsimile machine. Further, the customer must know something about the facsimile's ring cadence description and match the description to that which is provided by the local telephone company. Finally, because of the many variations in offered distinctive ring cadences, it is difficult to provide a sufficient number of user choices to enable a matching with all such offerings.

For instance, Bell South Services offers a service called "RING MASTER" which provides distinctive ring cadences that are each six seconds in length. The ring cadence may begin at any point in time and consists of 700 to 1,000 ms of ringing, followed by a 350 to 500 ms silent interval, followed by 700 to 1,000 ms of ringing, followed by a 3.5 to 4.25 second silent interval. The ringing pattern may also consist of 400 ms of ringing, followed by a 200 ms silent interval, followed by 400 ms of ringing, followed by a 200 ms silent interval, followed by 800 ms of ringing, followed by a 4 second silent interval.

A similar distinctive ring offering from Bellcore specifies the duration between ring cadences of 3 seconds, with the ring pattern being on-off-on-off-on. The first and third "on" segments are identical in duration and "short" (i.e., 200–500 ms). The second "on" segment is "long" in duration (i.e., 800–1,000 ms). The resulting ring pattern heard by the customer is thus "short-long-short". As is thus obvious, even ring cadences that appear "similar" differ substantially in detail, making it difficult to program a facsimile for many such "similar" offerings.

Telephone companies outside of the United States also offer distinctive ring cadence features, but the cadences are not necessarily identical with U.S.-based offerings. Thus, for products which are pre-programmed to respond to distinctive ring cadences and which are marketed on an international basis, predetermined, fixed cadences do not assure that a product will respond to all ring cadence offerings.

The prior art has approached this problem by attaching a separate controller between devices being called and the PSTN to enable recognition of a distinctive ring signal. In U.S. Pat. No. 5,040,209 to Greenberg et al., a controller is responsive to a number of distinctive ring cadences. The controller includes a number of output ports, each of which is associated with a respective one of the ring-initiating signals and is arranged to have a telephone, fax, answering machine or some other type of device connected to it. The controller, upon detecting a distinctive ring signal, prevents it from reaching all other connected devices and diverts it to just the device to which the ring signal is directed.

Other prior art avoids automatic response to a distinctive ring signal and requires a selection action by the user. For instance, in U.S. Pat. No. 5,086,458 to Bowen, a connection is established with a calling phone and the caller is required to push a key on the touch tone key pad to select a specific extension. A remote unit generates a ringing signal for that extension. In U.S. Pat. No. 5,062,133 to Melrose, a telephone call management system enables a caller to recursively activate a plurality of features, based upon key press inputs. Through one of those inputs, a caller may activate a distinctive ring to provide a special alerting function.

In U.S. Pat. No. 4,910,764 to Bowen, an interface device waits to determine if a tone that is characteristic of a facsimile transmission is heard. If such a tone is detected, the call is connected to a facsimile by a local ring action. If no such tone is detected, the call is connected to a telephone via a local ring action. In each of these systems, additional apparatus is required to enable multiple devices connected to a single telephone line to selectively respond to calls. The addition of such apparatus to control the call routing function adds both expense and complexity to the system.

Accordingly, it is an object of this invention to provide an improved distinctive ring cadence response system to a telecommunications device.

It is a further object of this invention to provide a distinctive ring cadence responsive device which is adaptable to many variations in distinctive ring cadences offered by multiple PSTN's.

It is yet another object of this invention to provide a telecommunications device with a distinctive ring cadence response feature requiring little or no additional equipment.

SUMMARY OF THE INVENTION

A telecommunications apparatus is connectable to a line accessible by multiple phone numbers from the public switched telephone network (PSTN). The PSTN identifies which telephone number on the line is being called by applying to the line a distinctive ring cadence. The telecommunications apparatus includes a processor, an interface for connecting to the PSTN, a memory for storing a distinctive ring cadence learn procedure and a nonvolatile memory. The processor is responsive to actuation of the distinctive ring learn procedure to monitor a received ring cadence and to derive distinctive ring data indicating characteristics of the received ring cadence. The processor stores the distinctive ring data in the nonvolatile memory and thereafter responds to received ring cadences to derive ring data therefrom. That ring data is compared with the stored distinctive ring data and if a substantial match is determined, causes the telecommunications apparatus to respond to the ring data.

DESCRIPTION OF THE DRAWINGS

FIG. 1 is a block diagram showing plural examples of telecommunications apparatus connected to a single telephone line from a PSTN.

FIG. 2 is a high level block diagram illustrating various components of a telecommunications apparatus that incorporates the invention hereof.

FIG. 3 is a waveform diagram illustrating a received ring signal its conversion to binary-form data.

DETAILED DESCRIPTION OF THE INVENTION

Figure 4:
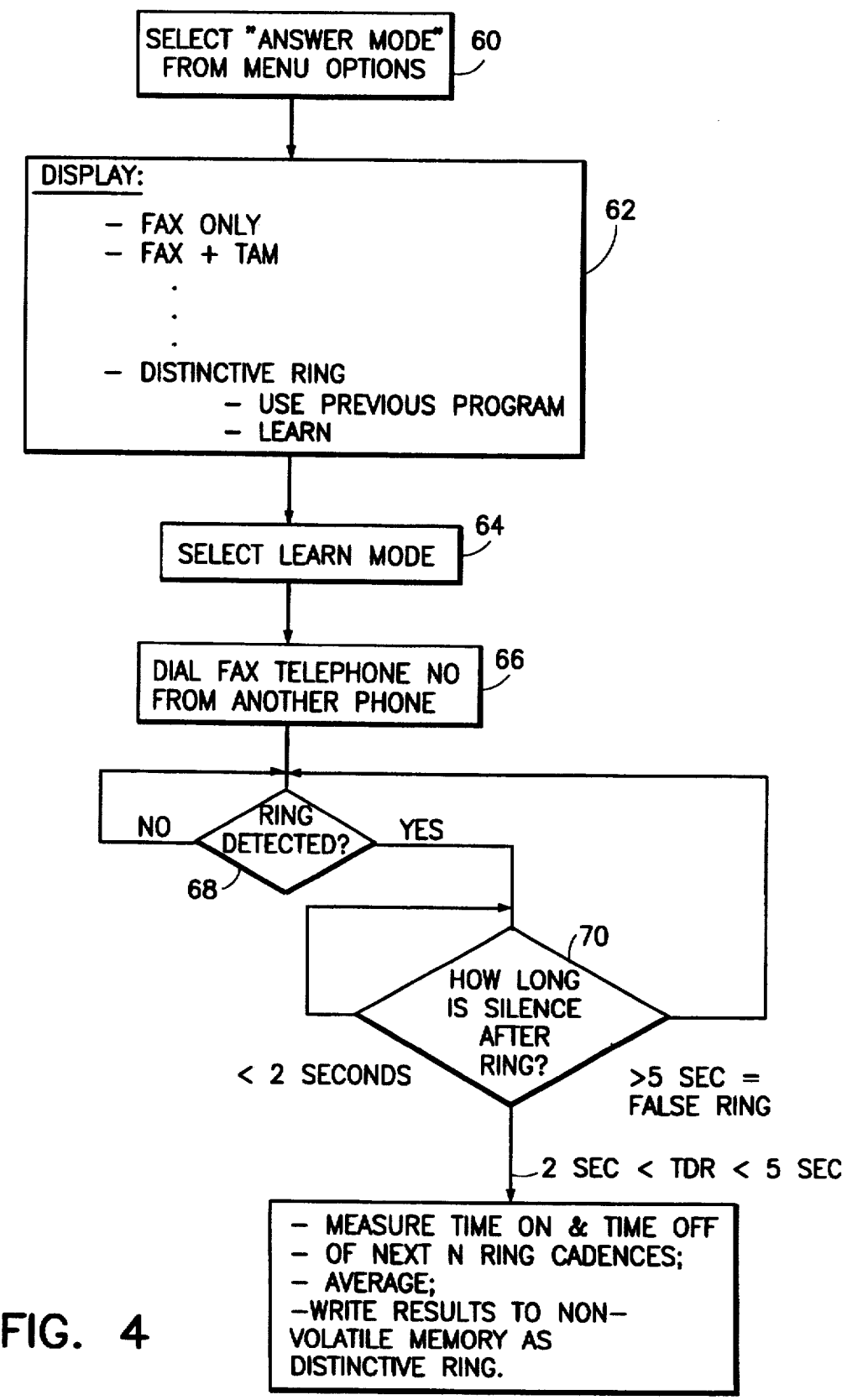
FIG. 4 is a logic flow diagram illustrating the operation of the invention, as implemented by the circuit diagram of FIG. 2.

Referring now to FIG. 1, a facsimile 10, telephone answering machine (TAM) 12 and telephone 14 are all connected in common to a single telephone line 16 emanating from PSTN 18. Fax 10, TAM 12 and telephone 14 each respond to a different distinctive ring cadence impressed on line 16 by PSTN 18. While the invention to be described below will be illustrated in the context of facsimile apparatus 10, it is to be understood that the basic features of the invention can be incorporated into any telecommunications apparatus that is meant to selectively respond to a distinctive ring cadence.

Turning to FIG. 2, facsimile 10 comprises plural fax mechanisms 20, a microprocessor 22, a random access memory (RAM) 24 and a read only memory (ROM) 26. ROM 26 includes the facsimile's operating system, a ring detection procedure and a learn procedure. The learn procedure enables facsimile 10 to "learn" distinctive features of an incoming distinctive ring cadence. RAM 24, among many entries, includes a menu listing which lists the learn procedure as a user-selectable option. Communications between the various modules of facsimile 10 are carried over a bus 28, to which are also connected a display 30 and a non-volatile memory 32.

Facsimile 10 also includes a network interface unit 54 which provides input/output functions necessary to couple facsimile 10 to the PSTN. Most of the I/O functions are directly related to facsimile operations and employ modem 36 for connections to and from bus 28. To enable the distinctive ring detect and learn procedures, I/O module includes a level detect module 38, isolator 40 and buffer 42. The latter, in combination with microprocessor 22 and ROM 26, enable analysis of an incoming ring cadence and storage of its distinctive features in buffer 42 for later transfer to non-volatile memory 32.

Level detect circuit 38 is responsive to a received ring signal 44 (see FIG. 3) to detect when ring signal 44 passes through a level 46. The output from level detect circuit 38 is square waveform 48. The duration of each square wave is indicative of the time between the rising and falling portions of ring signal waveform 44 in relation to level 46. The output level from level detect 38 is passed through isolator 40 and is stored in buffer 42 wherein it is sampled by microprocessor 22. Microprocessor 22 is thus able to sample the level in buffer store 42 and to determine the duration that that level is maintained. The resultant sampled values are analyzed to determine the duration of time that waveform 48 is at the one and zero levels, respectively, so as to obtain characteristics of the distinctive ring signal.

In FIG. 4, a logic flow diagram illustrates the method of operation of facsimile 10 in performing the invention hereof.

Facsimile 10, in the manner of other prior art facsimiles, includes plural entries in a menu displayable on display 30. By selecting one of the menu entries, the facsimile user can control an aspect of facsimile 10. Assuming that one of the menu entries is "answer mode" (box 60), the user may select that entry, causing an indication on display 30 of the various options available thereunder (see box 62). One of the displayed entries that is user-selectable is a "distinctive ring" entry. If the user moves a cursor to "distinctive ring" several alternatives are enabled, one of which is a previously programmed distinctive ring recognition ability and the other of which invokes a "learn" mode.

As shown in box 64, the user selects the "learn" mode so as to enable facsimile 10 to analyze a specific distinctive ring cadence to which it is to thereafter respond. At this point, the user dials the fax telephone number from another phone (box 66), thereby causing the PSTN to apply a distinctive ring cadence to NIU 34 in accordance with the telephone number assigned to facsimile 10. So long as no ring signal is detected (see decision box 68), the procedure recycles and awaits a ring. Once a ring signal is detected, the procedure moves to decision box 70.

It is known that a first distinctive ring cadence applied to an input line may exhibit a first signal that is foreshortened or otherwise distorted. To assure that a complete distinctive ring cadence signal is analyzed, the system waits until the first cadence has finished, a silent period has passed, and a second distinctive ring cadence is received. The period between distinctive ring cadences is determined by detecting a time length of a silent period on the incoming telephone line. If the silent period exceeds a first threshold, it is assumed that the silent period is not between two successive ring signals in a single distinctive ring cadence. If the silent period exceeds a second threshold, it is assumed that the signal, which was thought to be a ring signal and started the silence detection period, was not a ring signal but rather a signal anomaly, i.e., a lightning strike, noise, etc.. If the silent period is determined to be between the first and second thresholds, a valid silent period is assumed.

For example, assume the first threshold is set at two seconds and the second threshold is set at five seconds. If the silent period exceeds two seconds, it is assumed that the silent period is not one between two succeeding ring signals in the same cadence. If no distinctive ring cadence is detected before the silent period (time between rings) extends longer than five seconds, it is assumed that no distinctive ring cadence has been received. The procedure then recycles and continues to await for ring detection (box 68). If by contrast, a distinctive ring cadence is received within the two to five second time window, it is analyzed, as indicated in box 72, and the resulting data are written to non-volatile memory 32 as the distinctive ring cadence. The written data include time-on and time-off values for the distinctive ring cadence and tolerances for each. If necessary plural distinctive ring cadences may be detected and averaged to obtain a more accurate cadence determination. Thus, N cadences (where N=> 1) may be analyzed.

The time-on/time-off values are now stored in non-volatile memory 32 and the distinctive ring "learn" procedure is complete and the user causes facsimile 10 to be placed into the distinctive ring answer mode. Then, when a subsequent distinctive ring cadence is received by NIU 34, it is determined whether the newly received cadence matches that stored in non-volatile memory 32. A match is determined if the newly received cadence is within pre-stored tolerance, of the stored cadence. The tolerance values are preprogrammed values stored in memory. If a match is determined, facsimile 10 is caused to commence normal fax operations and to enter a standard hand-shaking mode. If no match is found, facsimile 10 ignores the ring signal.

The above-described procedure therefore enables a facsimile to be adapted to any distinctive ring cadence. The learn procedure may be operated at any time to accommodate a new ring cadence.

It should be understood that the foregoing description is only illustrative of the invention. Various alternatives and modifications can be devised by those skilled in the art without departing from the invention. For instance, while the invention has been described in the context of responding to a distinctive ring from the PSTN, it will also operate identically no matter what the source of the distinctive ring (e.g. PBX). Accordingly, the present invention is intended to embrace all such alternatives, modifications and variances which fall within the scope of the appended claims.

What is claimed is:

1. Telecommunications apparatus connectable to a multi-party line from a source of distinctive ring cadences, said source identifying which telephone number on said line is being called by applying to said line a distinctive ring cadence for each said telephone number, said telecommunications apparatus comprising:

interface means for connecting said telecommunications apparatus to the source;

memory means for storing a distinctive ring cadence learn procedure;

non-volatile memory means; and processor means responsive to a user actuation of said distinctive ring cadence learn procedure to monitor a distinctive ring cadence received via said interface means and to derive distinctive ring data which indicates characteristics of said distinctive ring cadence, said processor means deriving said distinctive ring data from analysis of a distinctive ring cadence, other than a first received ring cadence, said analysis performed only if said distinctive ring cadence occurs after a silent period from an immediately previous ring cadence, said silent period exceeding at least a first determined time, said processor means storing said distinctive ring data in said non-volatile memory means, said processor means thereafter responsive to a received distinctive ring cadence to derive ring data indicative of said received distinctive ring cadence and to compare said ring data with said stored distinctive ring data, and if a substantial match is determined therebetween, to enable said telecommunications apparatus to thereafter respond to said received distinctive ring cadence.

2. A telecommunication apparatus as recited in claim 1 wherein said processor means is controlled by said distinctive ring learn procedure to ignore as an artifact, any signal received after a second determined silent period, said second determined silent period greater than said first determined time plus a constant.

3. The telecommunication apparatus as recited in claim 1 wherein said processor means ignores any signal occurring after a silent period between rings wherein said silent period between rings is less than said first determined time.

4. The telecommunication apparatus as recited in claim 3 wherein said telecommunication apparatus is a facsimile.

* * * * *